United States Patent [19]

Kamisada et al.

[11] Patent Number: 5,555,539
[45] Date of Patent: Sep. 10, 1996

[54] MULTI-BEAM SPLIT-TYPE OPTICAL HEAD FOR USE IN OPTICAL DISK APPARATUS

[75] Inventors: Toshimasa Kamisada, Hiratsuka; Yasuo Kitada, Odawara, both of Japan

[73] Assignee: Hitachi, Ltd, Tokyo, Japan

[21] Appl. No.: 332,640

[22] Filed: Nov. 1, 1994

Related U.S. Application Data

[63] Continuation of Ser. No. 5,272, Jan. 19, 1993, abandoned.

[30] Foreign Application Priority Data

Jan. 30, 1992 [JP] Japan ................................ 4-15133

[51] Int. Cl.$^6$ ............................ G11B 7/135; G11B 7/08
[52] U.S. Cl. .......................... 369/219; 369/44.14
[58] Field of Search .................................. 369/219, 112, 369/122, 44.37, 44.12, 99, 135, 44.11, 44.13, 44.14, 100; 359/813, 814, 823, 824

[56] References Cited

U.S. PATENT DOCUMENTS

| 4,727,528 | 2/1988 | Wyland | 369/44.26 |
|---|---|---|---|
| 4,822,139 | 4/1989 | Yoshizumi | 369/44.16 |
| 4,922,454 | 5/1990 | Taki | 369/13 |
| 5,031,165 | 7/1991 | Fujita | 369/44.13 |
| 5,033,040 | 7/1991 | Fujita | 369/44.37 |
| 5,068,843 | 11/1991 | Takeshita et al. | 369/44.13 |
| 5,095,473 | 3/1992 | Gotoh | 369/44.14 |
| 5,105,407 | 4/1992 | Ishika | 369/44.37 |
| 5,105,410 | 4/1992 | Maeda et al. | 369/44.37 |
| 5,124,971 | 6/1992 | Nomura et al. | 369/219 |
| 5,191,624 | 3/1993 | Ito et al. | 369/44.11 |
| 5,200,937 | 4/1993 | Hosoya et al. | 369/219 |
| 5,235,591 | 8/1993 | Nakamura et al. | 369/199 |

FOREIGN PATENT DOCUMENTS

| 2353901 | 10/1973 | Germany | 369/219 |
|---|---|---|---|
| 61-42741 | 3/1986 | Japan . | |
| 61-117744 | 6/1986 | Japan . | |
| 63-112832 | 5/1988 | Japan . | |

OTHER PUBLICATIONS

IEEE Spectrum, Oct. 1994, p. 62.
"A New Composite Tracking Method for Two–Beam Split-type Optical Head", optical memory symposium held at Makuhari Messe in Japan on Jul. 9, 1990 (English abstract).

*Primary Examiner*—Stuart S. Levy
*Assistant Examiner*—David L. Ometz
*Attorney, Agent, or Firm*—Fay, Sharpe, Beall, Fagan, Minnich & McKee

[57] ABSTRACT

A multi-beam split-type optical head has optics including a stationary section and a movable section. A plurality of light beams generated from a plurality of light sources in the stationary section are parallel to a shifting direction of the movable section until entering the movable section, are then overlapped by a mirror or a dichroic mirror in the movable section such that they are mutually inclined with an angle θ therebetween, and converge at a plurality of positions each spaced by a predetermined distance on a track of an optical disk. The reflected light beams from the optical disk return to a detection optical system through the reverse itinerary.

10 Claims, 4 Drawing Sheets

F I G. 2
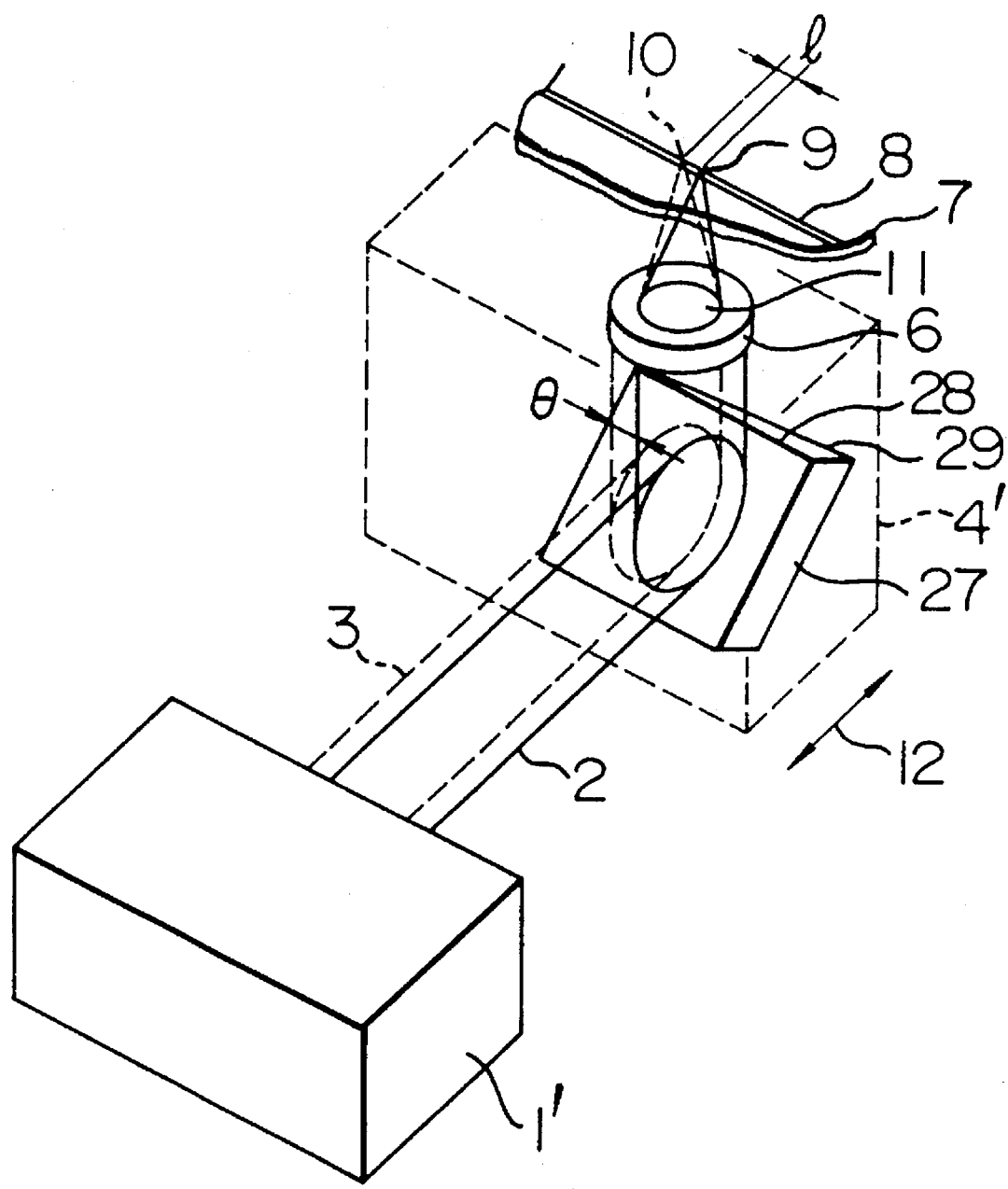

MULTI-BEAM SPLIT-TYPE OPTICAL HEAD FOR USE IN OPTICAL DISK APPARATUS

This is a continuation application of application Ser. No. 08/005,272, filed Jan. 19, 1993, now abandoned.

BACKGROUND OF THE INVENTION

The present invention relates to an optical head for use in an optical disk apparatus for recording, reproducing and erasing information on an optical disk by using a laser beam, and more particularly, to a multi-beam split-type optical head which has an optical system split or divided into a stationary section and a movable section, and which can irradiate an optical disk medium simultaneously with a plurality of laser beams to allow recording and reproduction to be simultaneously performed on and from different tracks.

Conventionally, there has been known a multi-beam optical head which simultaneously irradiates an optical disk medium with a plurality of laser beams to reproduce recorded information simultaneously or to monitor such recorded information immediately after the recording, or to simultaneously record or reproduce information in parallel on a plurality of different tracks. The structure of this type of optical head has an optical system split into a stationary section and a movable section, i.e., a split-type optical system, for example, as described in an article entitled "A New Composite Tracking Method for Two-beam Split-type Optical Head" from an optical memory symposium held at Makuhari Messe on Jul. 9, 1990. Specifically, two laser beams having different wavelengths from each other are overlapped by a dichroic mirror in the stationary section, and these overlapped laser beams are introduced to a single objective lens common to both beams disposed in the movable section to form a plurality of light spots at predetermined intervals on an optical disk medium.

When information recorded on an optical disk medium by the plurality of light spots is to be reproduced for monitoring immediately after the recording, these light spots are placed on a single track as front and rear spots with slight distances therebetween. On the other hand, when information is to be simultaneously recorded or reproduced on a disk medium in parallel by the plurality of light spots, these light spots are placed on a plurality of adjacent tracks on the disk with a slight distance therebetween.

SUMMARY OF THE INVENTION

In a multi-beam split-type optical head, a plurality of light spots passing through a common objective lens must be mutually separated before irradiating an optical disk. For this reason, each of the plurality of beams is required to have an inclination with respect to the others. The plurality of beams are mutually provided with such inclinations generally at the time they are overlapped with each other or at somewhere in the optical system before the overlapping operation. Therefore, if the plurality of beams are overlapped in a stationary section of a split-type optical head, the plurality of beams exiting from the stationary section have mutual inclinations.

Problems inherent to the above-mentioned conventional multi-beam split-type optical head will be explained with reference to FIGS. 4 and 5.

FIG. 4 illustrates problems due to the structure of a conventional multi-beam split-type optical head. The illustrated head positions two optical beams on a single track of an optical disk as front and rear beams, where the front optical beam is used for recording while the rear optical beam is used for reproduction or monitoring. In FIG. 4, a light beam 2 (represented by a solid line) and a light beam 3 (represented by a broken line) exiting from a stationary section 10 have an inclination θ with respect to each other. The beams 2, 3 are reflected by a mirror 5 disposed in a movable section 40 and condensed on a track 8 on an optical disk 7 by an objective lens 6 to form light spots 9 and 10 which are spaced by a distance 1 on the track 8. In this event, the light beams 2 and 3 entering the objective lens 6 are wide enough as compared with a pupil 11 of the objective lens 6 so that only part of the light beams pass through the pupil 11 of the objective lens 6.

FIG. 5 shows a range in which the light beams 2 and 3 pass through the pupil 11 when the moving section 40 shifts in the direction indicated by an arrow 12, i.e., in the radial direction of the disk, so as to cross the track 8 in FIG. 4. It can be seen from FIG. 5 that when the movable section 40 shifts to position the pupil 11 at positions 13 and 14, different ranges of the light beams 2 and 3 pass through the pupil 11. Particularly, the more the optical axis of the light beam 2 or 3 is inclined with respect to the shifting direction 12 of the movable section 14, the more significantly the range varies in which the pupil may pass.

If the ranges of the light beams 2, 3 passing through the pupil 11 vary due to the shift of the movable section 4, the position of a light beam (not shown) reflected by the optical disk 7 in FIG. 4 and returning again to the stationary section 10 changes due to the shift of the movable section 40. In other words, although the optical axis of the transmitted light beam 2 or 3 is constant or fixed, the optical axis of the returning light beam changes due to the shifting of the movable section. It may be also possible that when a light beam is not so wide compared with the pupil 11 of the objective lens, the intensity of the returning light beam changes as the movable section 40 shifts. These changes may cause errors in a detecting optical system when detecting a focus error signal, etc., in the stationary section 40.

Accordingly, it is an object of the present invention to provide a multi-beam split-type optical head which is capable of overcoming the problems inherent to the prior art, wherein even when a movable section shifts, this shifting of the movable section does not cause variations in ranges of a plurality of light beams exiting from a stationary section which pass through a pupil of an objective lens, and the intensities of the light beams returning to the stationary section do not change.

To achieve the above object, one aspect of the present invention includes a stationary section having a plurality of light sources, and a movable section including a common lens for focusing the plurality of light beams emitted from the stationary section on a plurality of positions on an optical disk medium. The movable section moves in the radial direction of the optical disk medium, and the plurality of light beams emitted from the stationary section toward the movable section have their optical axes made parallel to the shifting or moving direction of the movable section by an optical system provided in the stationary section. Further, the movable section includes means for providing the plurality of light beams with mutual inclinations such that the plurality of light beams are condensed at a plurality of positions on the optical disk.

In a preferred embodiment, the optical axes of the plurality of light beams are parallel to each other in a region between the stationary section and the movable section, and the movable section may be provided with means for overlapping these optical beams such that they mutually form angles. Alternatively, the stationary section may be provided with means for overlapping the plurality of light beams exiting from the stationary section such that the optical axes thereof substantially coincide with each other.

When wavelengths of the plurality of light sources are different from each other, a wavelength selecting mirror (dichroic mirror) may be employed as the means for overlapping the collimated light beams such so that they mutually form angles. Alternatively, when the wavelengths of the plurality of light sources are different from each other, the movable section may be provided with a wedge-shaped wavelength selecting mirror (dichroic mirror) as the means for providing the plurality of these light beams with mutual inclinations after the plurality of light beams have been overlapped in the stationary section, so that the optical axes thereof coincide with each other.

According to the present invention, the plurality of light beams exiting from the stationary section and reaching the movable section are processed such that the optical axes thereof are parallel to the shifting or moving direction of the movable section, and the movable section is provided with the means for forming angles among the plurality of these light beams, so that the ranges of the respective light beams passing through the pupil of the objective lens do not vary even if the movable section shifts or moves. Accordingly, since the positions and intensities of the light beams reflected by an optical disk and returning to the stationary section are not changed by the shifting or moving of the movable section, a focus error signal and a track error signal will not include any detection errors in a signal detecting optical system for detecting these focus error signal and track error signals.

BRIEF DESCRIPTION OF THE DRAWINGS

FIG. 2 is a perspective view showing the structure of a multi-beam split-type optical head according to another embodiment of the present invention;

DESCRIPTION OF THE PREFERRED EMBODIMENTS

Figure 1:
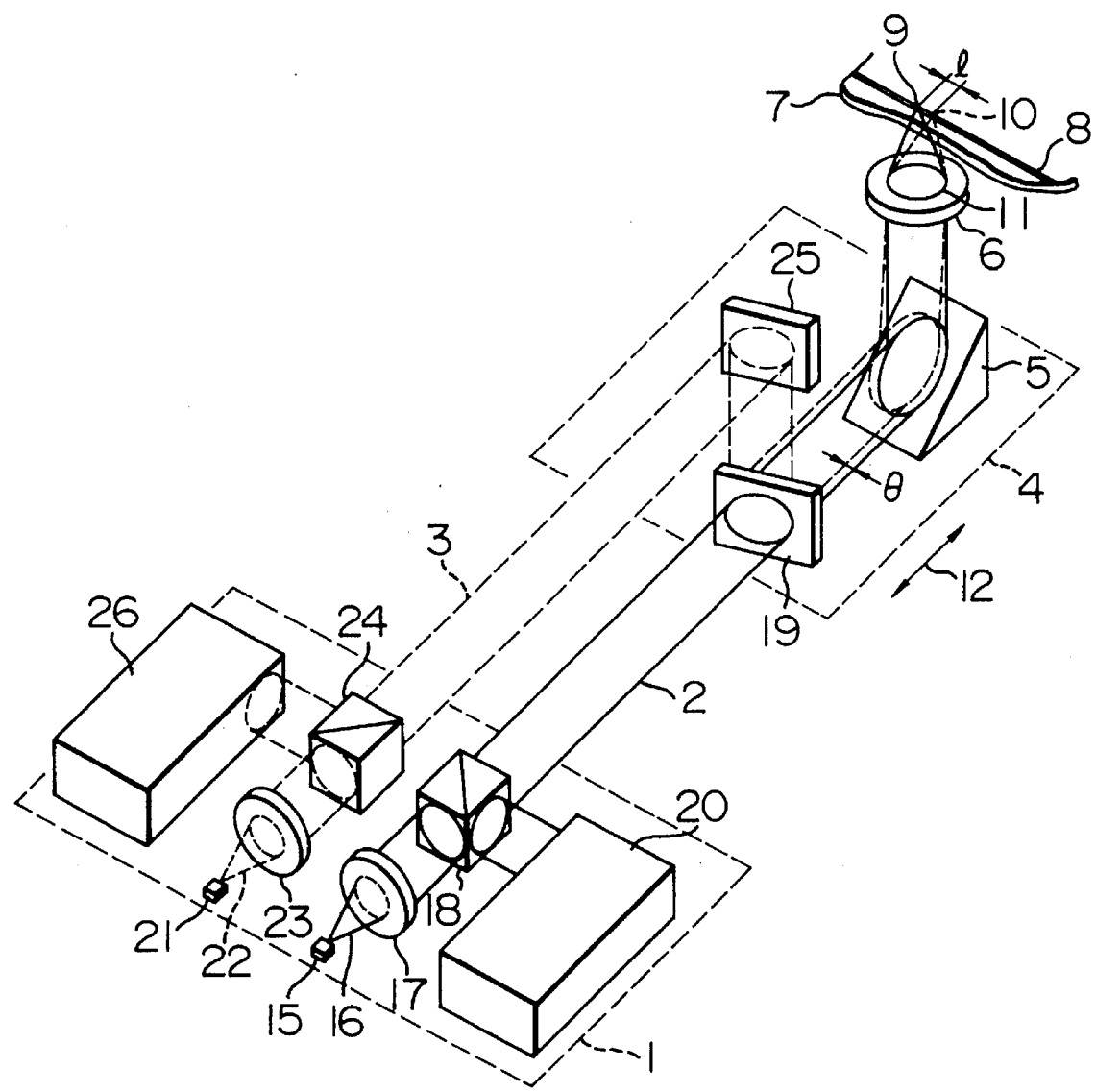
FIG. 1 is a perspective view showing the structure of a multi-beam split-type optical head according to an embodiment of the present invention.

Embodiments of the present invention will hereinafter be described with reference to the accompanying drawings. Here, like members are designated by like reference numerals through all the drawings.

FIG. 1 illustrates an embodiment of a multi-beam split-type optical head according to the present invention.

A light beam 16 generated from a semiconductor laser 15 is collimated by a collimator lens 17 and emitted from a stationary section 1 through a beam splitter 18. This emitted light beam 2 advances in parallel with a direction indicated by an arrow 12 which is a shifting direction of a movable section 4, passes through a dichroic mirror 19, and is reflected by a mirror 5. Then, the light beam passing through a pupil 11 of an objective lens 6 forms a light spot 9 on a track 8 of an optical disk 7 by the action of the objective lens 6. A light beam reflection from the light spot 9 again passes through the objective lens, the mirror 5 and the dichroic mirror 19, exits from the movable section 4 to return to the stationary section 1, and is reflected by the beam splitter 18 to reach a detecting optical system 20. The detecting optical system 20 employs a focus error signal, a track error signal and a reproduced signal representing data recorded on the optical disk 7 for detecting the position of the light spot 9.

Meanwhile, a light beam 22 generated by a semiconductor laser 21 having a wavelength different from that of the semiconductor laser 15 is collimated by a collimator lens 23 and emitted from the stationary section 1 through a beam splitter 24. This emitted light beam 3, like the light beam 2, advances in parallel with the direction indicated by the arrow 12, is reflected by a mirror 25 disposed in the movable section 4, and is further reflected by the dichroic mirror 19 to overlap with the light beam 2 with an angle θ therebetween. A light beam reflected by the mirror 5 and passing through the pupil 11 of the objective lens 6 forms a light spot 10 on the track 8 at a position spaced by a distance 1 from the light spot 9. Assuming that the focal length of the objective lens 6 is f, the distance 1 is a value determined by l=ftan θ.

A reflected light beam of the light spot 10 again passes through the objective lens 6, the mirror 5, the dichroic mirror 19 and the mirror 25, exits from the movable section 4 to return to the stationary section 1, and is reflected by the beam splitter 24 to reach a detecting optical system 26. The detecting optical system 26 also utilizes the focus error signal, the track error signal and the reproduced signal of the recorded data for detecting the position of the light spot 10. It should be noted that the detection of these signals may be partially omitted in one of the detecting optics 20 and 26 if necessary.

It will be appreciated as a feature of this embodiment that since the light beams 2 and 3 are set in parallel with the shifting or moving direction of the movable section 4 indicated by the arrow 12, the ranges of the light beams 2 and 3 passing through the pupil 11 of the objective lens 3 will not vary even if the movable section 4 shifts. Accordingly, the positions of the light beams returning to the stationary section 1 will not change, and no detection error will thus be included in the focus error signal and the track error signal.

Although the semiconductor lasers 2 and 3 have different wavelengths from each other in the foregoing embodiment, they may have the same wavelength. In this case, a half mirror or a mirror having a polarization characteristic may be employed in place of the dichroic mirror 19.

Figure 3:
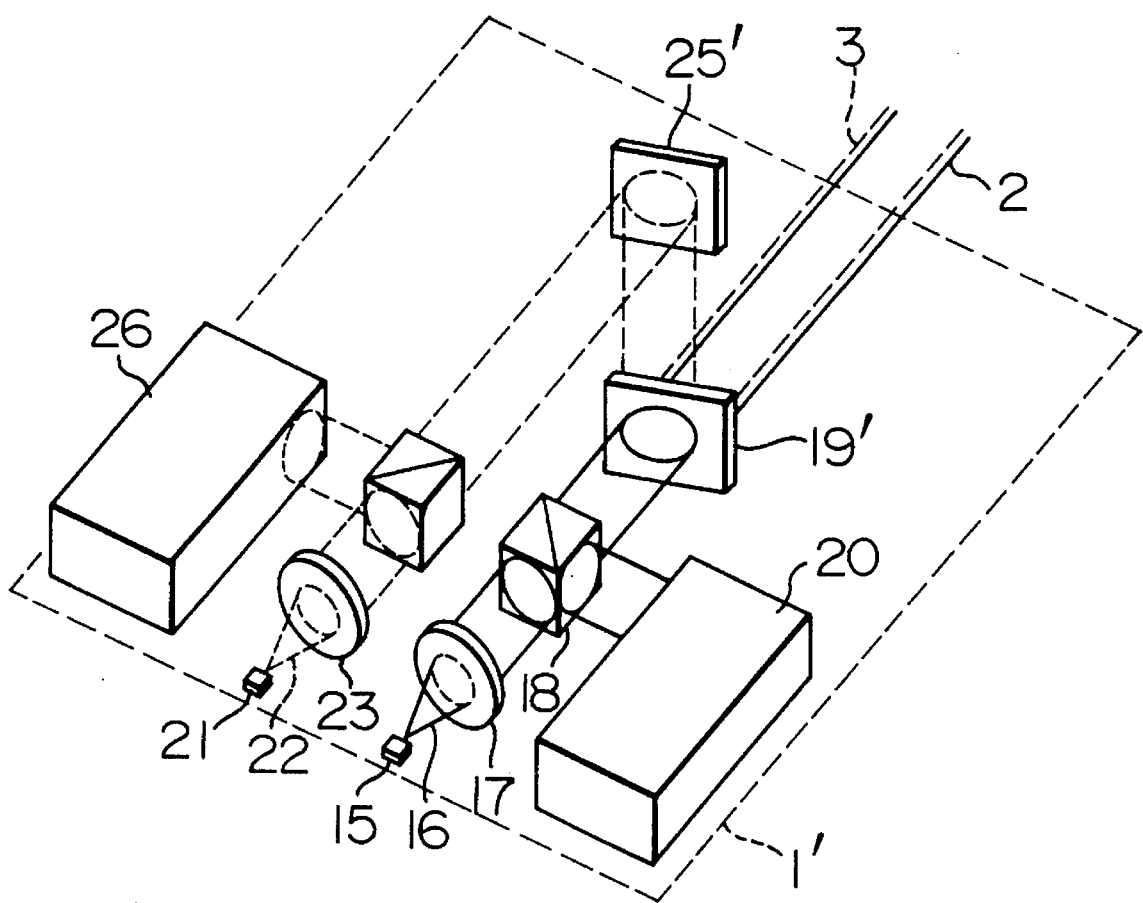
FIG. 3 illustrates the structure of a stationary section of the embodiment shown in FIG. 2.
Figure 4:
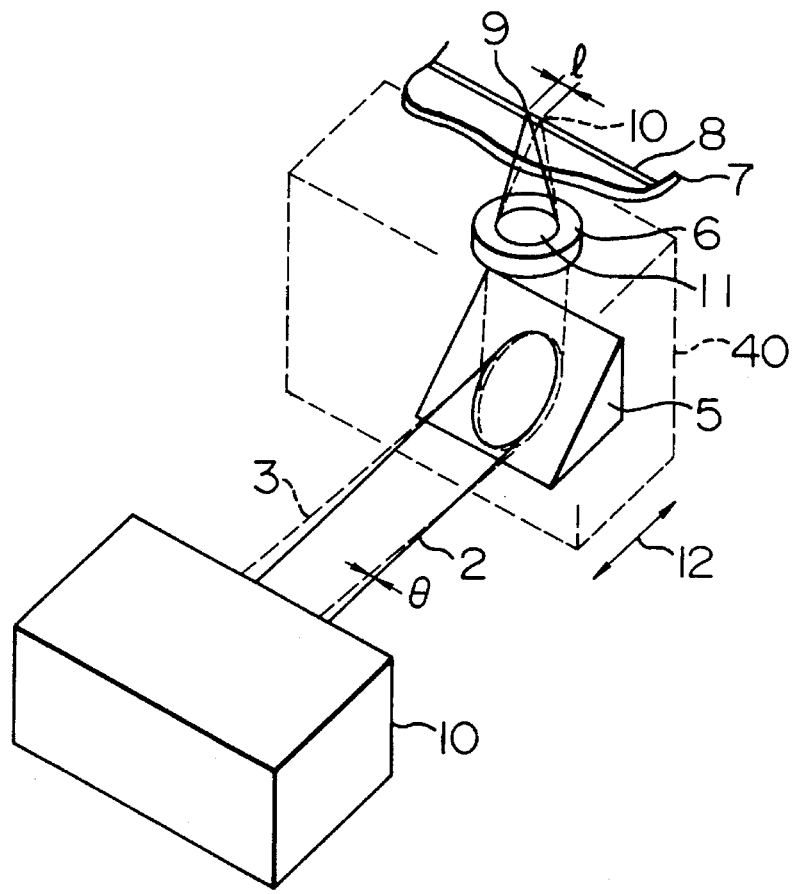
FIG. 4 is a perspective view illustrating problems of a conventional multi-beam split-type optical head.
Figure 5:
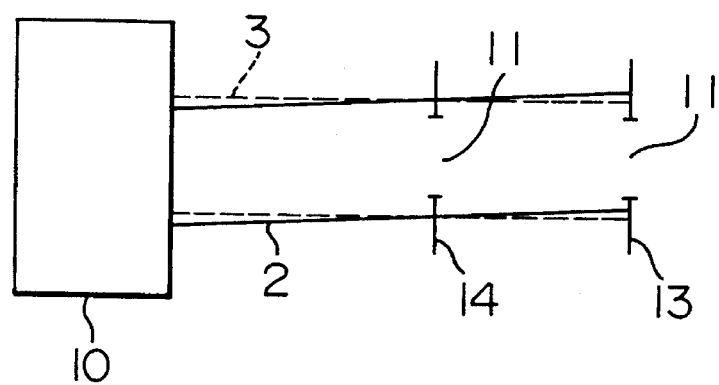
FIG. 5 is a diagram useful for explaining the conventional multi-beam split-type optical head.

FIG. 2 illustrates another embodiment of a multi-beam split-type optical head according to the present invention, and FIG. 3 illustrates the structure of a stationary section 1' of the optical head shown in FIG. 2. This embodiment will be described with reference to FIGS. 2 and 3.

A light beam 16 generated from semiconductor laser 15 in the stationary section 1' is collimated by a collimator lens 17 and emitted from the stationary section 1' through a beam splitter 18 and a dichroic mirror 19'. This emitted light beam 2 advances in parallel with a direction indicated by an arrow 12 which is a shifting or moving direction of a movable section 4', passes through a first plane 28 of a dichroic mirror 27 disposed in the movable section 4', and is reflected by a second plane 29 of the dichroic mirror 27. Then, a light beam passing through a pupil 11 of an objective lens 6 forms a light spot 9 on a track 8 of an optical disk 7. A reflected light beam of the optical spot 9 again passes through the objective lens 6 and the first plane 28 of the dichroic mirror 27, is reflected by the second plane 29, exits from the movable section 4' to return to the stationary section 1', and is reflected by the dichroic mirror 19' and the beam splitter 18 to reach a detecting optical system 20. The optical system 20 utilizes a focus error signal, a track error signal and the reproduced data representing data recorded on the optical disk for detecting the position of the light spot 9.

Meanwhile, a light beam 22 generated from a semiconductor laser 21 having a wavelength different from that of the semiconductor laser 15 is collimated by a collimator lens 23, passes through a beam splitter 24, and is reflected by a mirror 25 and the dichroic mirror 19' and emitted from the stationary section 1'. This emitted light beam 3, like the light beam 2, advances in parallel with the direction indicated by the arrow 12, is reflected by the first plane 28 of the dichroic mirror 27 disposed in the movable section 4' to overlap with the light beam 2 with an angle θ therebetween. A light beam passing through the pupil 11 of the objective lens 6 forms a light spot 10 on the track 8 at a position spaced by a distance 1 from the light spot 9. Assuming that the focal length of the objective lens 6 is f, the distance 1 is a value determined by 1=ftan θ. A reflected light beam of the light spot 10 again passes through the objective lens 6, is reflected by the first plane 28 of the dichroic mirror 27, exits from the movable section 4' to return to the stationary section 1', and is reflected by the dichroic mirror 9', the mirror 25 and the beam splitter 24 to reach a detecting optical system 26. The detecting optical system 26 also utilizes the focus error signal, the track error signal and the reproduced signal of the data for detecting the position of the light spot 10. It should be noted that the detection of these signals may be partially omitted in one of the detecting optics 20 and 26 if necessary.

In the above described structure, the light beams 2 and 3 having different wavelengths emitted from the stationary section 1' overlap with each other in the stationary section 1', and are each adjusted in parallel with the shifting or moving direction of the movable section 4 indicated by the arrow 12.

The wedge-shaped dichroic mirror 27 disposed in the movable section 4' has a wavelength selecting reflection film formed on the first plane 28 through which the light beam 2 is transmitted, and by which the light beam 3 is reflected. Further, a total reflection film is formed on the second plane 29 of the dichroic mirror 27, such that the light beam 2 transmitted through the first plane 28 is reflected by the second plane 29 and again transmitted through the first plane 28. Since the first plane 28 and the second plane 29 are arranged to form an angle (substantially θ/2) therebetween, the light beams 2 and 3 enter the objective lens 6 with an inclination of the angle θ, whereby the light spots 9 and 10 are formed with the distance 1 therebetween. Since the light beams 2 and 3 are each parallel to the shifting or moving direction of the movable section 4' indicated by the arrow 12, the shifting of the movable section 4' will not cause any variation of the range of the light beams 2 and 3 passing through the pupil 11 of the objective lens 6. Accordingly, the positions of the light beams returning to the stationary section 1' will not change, whereby the focus error signal and the track error signal will be free from detection errors.

Although the foregoing embodiments have been explained for the case where a recording beam and a reproducing beam are positioned on a single track, and recorded information is immediately monitored by the reproducing beam, the present invention can be likewise applied to the case where a plurality of light beams are positioned on different tracks, and recording or reproduction is simultaneously performed by these light beams.

According to the present invention as described above in detail, since the movable section is provided with means for mutually inclining a plurality of light beams so as to direct these light beams onto a plurality of positions on an optical disk, the plurality of light beams exiting from the stationary section can be each set in parallel with the shifting direction of the movable section, whereby the positions of the light beams returning from the movable section to the stationary section will not change due to the shifting or moving of the movable section, with the result that the focus error signal and the track error signal are free from detection errors.

We claim:

1. A multi-beam split-type optical head for an optical disk apparatus, comprising:

a stationary section including a plurality of light sources; and a movable section shiftable with respect to the stationary section for receiving parallel light beams generated by the plurality of light sources and for recording/reproducing data using the light beams, said light beams including first and second light beams having different respective wavelengths;

wherein said stationary section includes optical means for emitting the light beams generated by the plurality of light sources, the optical axes of the light beams after being emitted from the stationary section being substantially parallel to the shifting direction of said movable section;

wherein said movable section includes a wedge-shaped dichroic mirror for inclining said light beams with respect to each other to maintain a range of the light beams during movement by the movable section, said dichroic mirror having first and second surfaces angled with respect to each other, and a common lens for converging said inclined light beams to form light spots at a plurality of positions respectively spaced by a predetermined distance; and wherein the first light beam has a wavelength that is passed by said first surface but reflected by said second surface toward said common lens, and wherein the second light beam has a wavelength that is reflected by said first surface toward said common lens, such that the first and second light beams overlap each other after reflection from the second and first surfaces, respectively.

2. A multi-beam split-type optical head according to claim 1, wherein said optical means includes means for overlapping said plurality of emitted light beams so as to coincide the optical axes thereof with each other.

3. In an optical disk apparatus for recording/reproducing information on/from an optical disk, the improvement comprising:

a multi-beam split-type optical head including:
   a stationary section including a plurality of light sources; and
   a movable section shiftable with respect to the stationary section in the radial direction of said optical disk for receiving parallel light beams generated by the plurality of light sources and for recording/reproducing data using the light beams, said light beams including first and second light beams having different respective wavelengths;

wherein said stationary section includes an optical system for emitting the light beams generated by the plurality of light sources, the optical axes of the light beams after being emitted from the stationary section being substantially parallel to the shifting direction of said movable section;

wherein said movable section includes a dichroic mirror for inclining said light beams with respect to each other to maintain a range of the light beams during movement by the movable section, said dichroic mirror having first and second surfaces angled with respect to each other, and a common lens for converging said inclined light beams to form light spots at a plurality of positions, on said optical disk, respectively spaced by a predetermined distance; and wherein the first light beam has a wavelength that is passed by said first surface but reflected by said second surface toward said common lens, and wherein the second light beam has a wavelength that is reflected by said first surface toward said common lens, such that the first and second light beams overlap each other after reflection from the second and first surfaces, respectively.

4. An optical disk apparatus according to claim 3, wherein said optical system includes means for overlapping said plurality of emitted light beams so as to coincide the optical axes thereof with each other.

5. A multi-beam split-type optical head for an optical disk apparatus, comprising:

a stationary section including a plurality of light sources; and a movable section shiftable with respect to the stationary section for receiving parallel light beams generated by the plurality of light sources and for recording/reproducing data using the light beams, said light beams including first and second light beams having different respective wavelengths;

wherein said stationary section includes optical means for emitting the light beams generated by the plurality of light sources;

wherein said movable section includes a dichroic mirror for inclining said light beams with respect to each other to maintain a range of the light beams during movement by the movable section, said dichroic mirror having first and second surfaces angled with respect to each other, and a common lens for converging said inclined light beams to form light spots at a plurality of positions respectively spaced by a predetermined distance; and wherein the first light beam has a wavelength that is passed by said first surface but reflected by said second surface toward said common lens, and wherein the second light beam has a wavelength that is reflected by said first surface toward said common lens, such that the first and second light beams overlap each other after reflection from the second and first surfaces, respectively.

6. In an optical disk apparatus for recording/reproducing information on/from an optical disk, the improvement comprising:

a multi-beam split-type optical head including:

a stationary section including a plurality of light sources; and a movable section shiftable with respect to the stationary section in the radial direction of said optical disk for receiving parallel light beams generated by the plurality of light sources and for recording/reproducing data using the light beams, said light beams including first and second light beams having different respective wavelengths;

wherein said stationary section includes an optical system for emitting the light beams generated by the plurality of light sources;

wherein said movable section includes a dichroic mirror for inclining said light beams with respect to each other to maintain a range of the light beams during movement by the movable section, said dichroic mirror having first and second surfaces angled with respect to each other, and a common lens for converging said inclined light beams to form light spots at a plurality of positions, on said optical disk, respectively spaced by a predetermined distance; and wherein the first light beam has a wavelength that is passed by said first surface but reflected by said second surface toward said common lens, and wherein the second light beam has a wavelength that is reflected by said first surface toward said common lens, such that the first and second light beams overlap each other after reflection from the second and first surfaces, respectively.

7. A multi-beam split-type optical head for an optical disk apparatus, comprising:

a stationary section including a plurality of light sources; and a movable section shiftable with respect to the stationary section in the radial direction of said optical disk for receiving a plurality of parallel light beams generated by the plurality of light sources and for recording/reproducing data using the light beams, wherein said light beams include first and second light beams having different respective wavelengths and wherein said stationary section includes an optical system for overlapping said plurality of light beams generated from said plurality of light sources and for emitting said overlapped light beams in the direction parallel to the shifting direction of said movable section so that said overlapped light beams reach said movable section to maintain a range of the light beams during movement by the movable section, wherein said movable section includes a wedge-shaped dichroic mirror for inclining said light beams with respect to each other, said dichroic mirror having first and second surfaces angled with respect to each other, and a common lens for converging said inclined light beams to form light spots, on said optical disk, at a plurality of positions respectively spaced by a predetermined distance, and wherein the first light beam has a wavelength that is passed by said first surface but reflected by said second surface toward said common lens, and wherein the second light beam has a wavelength that is reflected by said first surface toward said common lens, such that the first and second light beams are inclined with respect to each other by a relative predetermined angle after reflection from the second and first surfaces, respectively.

8. In an optical disk apparatus for recording/reproducing information on/from an optical disk, the improvement comprising:

a multi-beam split-type optical head including:

a stationary section including a plurality of light sources; and a movable section shiftable with respect to the stationary section in the radial direction of said optical disk for receiving parallel light beams generated by the plurality of light sources and for recording/reproducing data using the light beams, said light beams including first and second light beams having different respective wavelengths, wherein said stationary section includes an optical system for overlapping the light beams generated by the plurality of light sources and for emitting said overlapped light beams in the direction parallel to the shifting direction of said movable section to reach said movable section to maintain a range of the light beams during movement by the movable section, wherein said movable section includes means, including a wedge-shaped dichroic mirror, for inclining said light beams with respect to each other, said dichroic mirror having first and second surfaces angled with respect to each other, and a common lens for converging said inclined light beams to form light spots at a plurality of positions, on said optical disk, respectively spaced by a predetermined distance, and wherein the first light beam has a wavelength that is passed by said first surface but reflected by said second surface toward said common lens, and wherein the second light beam has a wavelength that is reflected by said first surface toward said common lens, such that the first and second light beams overlap each other with a predetermined relative angle after reflection from the second and first surfaces, respectively.

9. An optical disk apparatus according to claim 8, wherein said common lens converges said inclined light beams so as to respectively form said light spots on a single track on said optical disk.

10. An optical disk apparatus according to claim 8, wherein said common lens converges said inclined light beams so as to respectively form said light spots on different respective tracks of said optical disk.

* * * * *